United States Patent
Umeda et al.

(10) Patent No.: US 10,215,150 B2
(45) Date of Patent: Feb. 26, 2019

(54) WATER FLOW POWER GENERATOR

(71) Applicant: MITSUBISHI HEAVY INDUSTRIES, LTD., Tokyo (JP)

(72) Inventors: Akihiko Umeda, Tokyo (JP); Shin Asano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/551,119

(22) PCT Filed: Oct. 23, 2015

(86) PCT No.: PCT/JP2015/079951
§ 371 (c)(1),
(2) Date: Aug. 15, 2017

(87) PCT Pub. No.: WO2016/132600
PCT Pub. Date: Aug. 25, 2016

(65) Prior Publication Data
US 2018/0038339 A1    Feb. 8, 2018

(30) Foreign Application Priority Data
Feb. 17, 2015 (JP) .................. 2015-028496

(51) Int. Cl.
*F03B 3/04* (2006.01)
*F03B 13/26* (2006.01)
(Continued)

(52) U.S. Cl.
CPC ............... *F03B 3/04* (2013.01); *F03B 15/00* (2013.01); *F03B 17/061* (2013.01);
(Continued)

(58) Field of Classification Search
USPC ................................................ 290/54; 416/1
See application file for complete search history.

(56) References Cited

U.S. PATENT DOCUMENTS 3,584,984 A * 6/1971 Majkowski ............... F01C 1/20
418/187
5,125,131 A * 6/1992 Leblanc .............. E05D 11/1007
16/329
(Continued)

FOREIGN PATENT DOCUMENTS

CN    102080629    6/2011
CN    102459866    5/2012
(Continued)

OTHER PUBLICATIONS

International Search Report dated Jan. 26, 2016 in International Application No. PCT/JP2015/079951, with English translation.
(Continued)

*Primary Examiner* — Pedro J Cuevas
(74) *Attorney, Agent, or Firm* — Wenderoth, Lind & Ponack, L.L.P.

(57) ABSTRACT

A water flow power generator includes a nacelle, a vane wheel that is disposed so as to be rotatable relative to the nacelle, and that is rotated by a water flow while including a plurality of blades, a power generator that is disposed inside the nacelle, and that generates electric power by using rotating power transmitted from the vane wheel, and a vane wheel rotation stopping mechanism that is disposed in the nacelle, that includes a rod which can enter the inside of a rotational trajectory of the vane wheel, and that stops the rotation of the vane wheel.

3 Claims, 6 Drawing Sheets

(51) Int. Cl.
*F03B 15/00* (2006.01)
*F03B 17/06* (2006.01)

(52) U.S. Cl.
CPC ......... *F03B 13/264* (2013.01); *F05B 2240/50* (2013.01); *F05B 2260/90* (2013.01); *Y02E 10/28* (2013.01); *Y02E 10/38* (2013.01)

(56) References Cited

U.S. PATENT DOCUMENTS

| | | | | |
|---|---|---|---|---|
| 5,367,943 | A * | 11/1994 | Stoll | B25J 9/14 91/61 |
| 5,947,204 | A * | 9/1999 | Barton | E21B 33/1295 166/311 |
| RE39,209 | E * | 8/2006 | Barton | E21B 33/1295 166/311 |
| 7,397,145 | B2 * | 7/2008 | Struve | F03D 7/0244 290/55 |
| 8,624,413 | B2 * | 1/2014 | Tsutsumi | F16H 61/431 290/44 |
| 9,470,208 | B2 * | 10/2016 | Nies | F03D 7/0268 |
| 2010/0181774 | A1 | 7/2010 | Dehlsen et al. | |
| 2011/0123339 | A1 | 5/2011 | Eriksen et al. | |
| 2012/0133140 | A1 | 5/2012 | Cornelius et al. | |
| 2013/0076040 | A1 * | 3/2013 | Tsutsumi | F03D 9/28 290/54 |
| 2014/0010651 | A1 * | 1/2014 | Nies | F03D 7/0268 416/1 |
| 2014/0010656 | A1 * | 1/2014 | Nies | F03D 7/0244 416/204 R |
| 2014/0021816 | A1 * | 1/2014 | Lemma | H02K 1/30 310/77 |
| 2014/0369837 | A1 | 12/2014 | Rohden et al. | |
| 2017/0260962 | A1 * | 9/2017 | Futahashi | F03B 13/10 |
| 2017/0314525 | A1 * | 11/2017 | Futahashi | F03B 13/10 |

FOREIGN PATENT DOCUMENTS

| | | |
|---|---|---|
| CN | 103917775 | 7/2014 |
| JP | 45-001443 | 1/1970 |
| JP | 5-180140 | 7/1993 |
| JP | 2005-069055 | 3/2005 |
| JP | 2010-531956 | 9/2010 |
| JP | 2011-112055 | 6/2011 |
| JP | 2012-525535 | 10/2012 |
| JP | 2014-532836 | 12/2014 |
| WO | 2010/125476 | 11/2010 |

OTHER PUBLICATIONS

Written Opinion of the International Searching Authority dated Jan. 26, 2016 in International Application No. PCT/JP2015/079951, with English translation.

* cited by examiner

WATER FLOW POWER GENERATOR

TECHNICAL FIELD

The present invention relates to a water flow power generator.

Priority is claimed on Japanese Patent Application No. 2015-028496, filed on Feb. 17, 2015, the content of which is incorporated herein by reference.

BACKGROUND ART

As disclosed in Patent Document 1, a water flow power generator which generates electric power by using an ocean current and a water flow in seas or rivers includes a vane wheel and a power generator. The vane wheel has a plurality of blades (vanes) extending toward an outer peripheral side. In the power generator, an end portion of a rotating shaft is connected to the vane wheel, and the rotating shaft is rotated together with the vane wheel rotated by the ocean current and the water flow, thereby generating electric power.

This underwater power generator includes a brake mechanism in order to stop the rotation of the vane wheel during maintenance work.

CITATION LIST

Patent Literature

[Patent Document 1] Published Japanese Translation No. 2012-525535 of the PCT International Publication

SUMMARY OF INVENTION

Technical Problem

A brake device of the water flow power generator described above is driven using hydraulic pressure or electricity in many cases. Therefore, the brake device is usually installed in a power generator room located in an air atmosphere rather than an underwater atmosphere.

Torque in response to the ocean current is always generated in the vane wheel. Therefore, for example, in a case where a failure such as transmission failure occurs in a transmission system between the vane wheel and the power generator room, it is assumed that the rotation of the vane wheel cannot be stopped by the brake device.

In a case where the water flow power generator is installed in the deep sea where the water pressure is high, if a normal brake device is installed, a watertight structure becomes complicates, thereby inevitably increasing the cost. Therefore, in the above-described underwater power generator, it is desirable that a device for forcibly stopping the rotation of the vane wheel is provided for an emergency at low cost, apart from a brake mechanism.

The present invention aims to provide a water flow power generator which can reliably stop the rotation of a vane wheel at low cost.

Solution to Problem

According to a first aspect of this invention, a water flow power generator includes a substrate, a vane wheel that is disposed so as to be rotatable relative to the substrate, and that rotates while causing a plurality of vanes to capture a water flow. The water flow power generator further includes a power generator that is disposed inside the substrate, and that outputs electric energy by converting rotational energy transmitted from the vane wheel into the electric energy. The water flow power generator further includes a vane wheel rotation stopping mechanism that is disposed in the substrate, and that has a rotation stopping member which can enter the inside of a rotational trajectory from the outside of the rotational trajectory of the vane wheel.

According to this configuration, the rotation stopping member of the vane wheel rotation stopping mechanism is enabled to enter the inside of the rotational trajectory of the vane wheel. Therefore, the rotation stopping member can interfere with the vane of the vane wheel. In this manner, the rotation of the vane wheel can be stopped.

According to a second aspect of this invention, in the water flow power generator in the first aspect, the rotation stopping member may be a rod which is slidable in a longitudinal direction thereof.

According to this configuration, the rod can interfere with the vane of the vane wheel by causing the rod to enter the inside of the rotational trajectory of the vane wheel. Therefore, the rotation of the vane wheel can be stopped.

According to a third aspect of this invention, in the water flow power generator in the second aspect, the rod may have a sharp corner having a sharp section oriented in a direction opposite to a rotation direction of the vane wheel, at a location intersecting at least the rotational trajectory.

According to this configuration, when the sharp corner of the rod disposed in the rotational trajectory of the vane wheel collides with the vane, the sharp corner can interlock with the vane of the vane wheel or can cut the vane. As a result, the rotation of the vane wheel can be more reliably stopped.

According to a fourth aspect of this invention, in the water flow power generator in the first aspect, the rotation stopping member may be a restiform body that can be deployed toward the inside of the rotational trajectory.

According to this configuration, the restiform body deployed toward the inside of the rotational trajectory is entangled with the vane wheel. Therefore, the rotation of the vane wheel can be stopped.

Advantageous Effects of Invention

According to the water flow power generator, it is possible to reliably stop the rotation of a vane wheel at low cost.

DESCRIPTION OF EMBODIMENTS

First Embodiment

Figure 1:
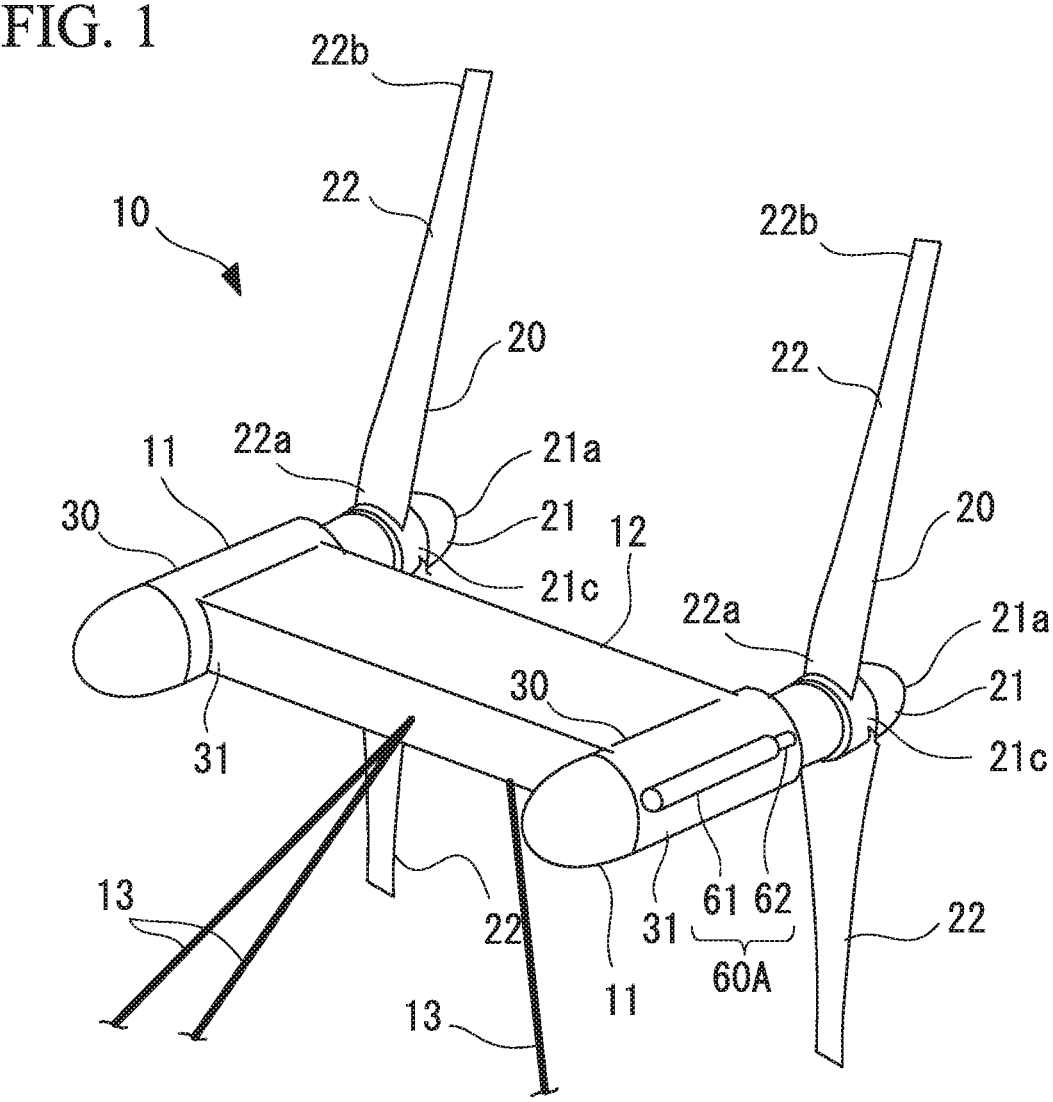
FIG. 1 is a perspective view showing a water flow power generator according to an embodiment of this invention.
Figure 2:
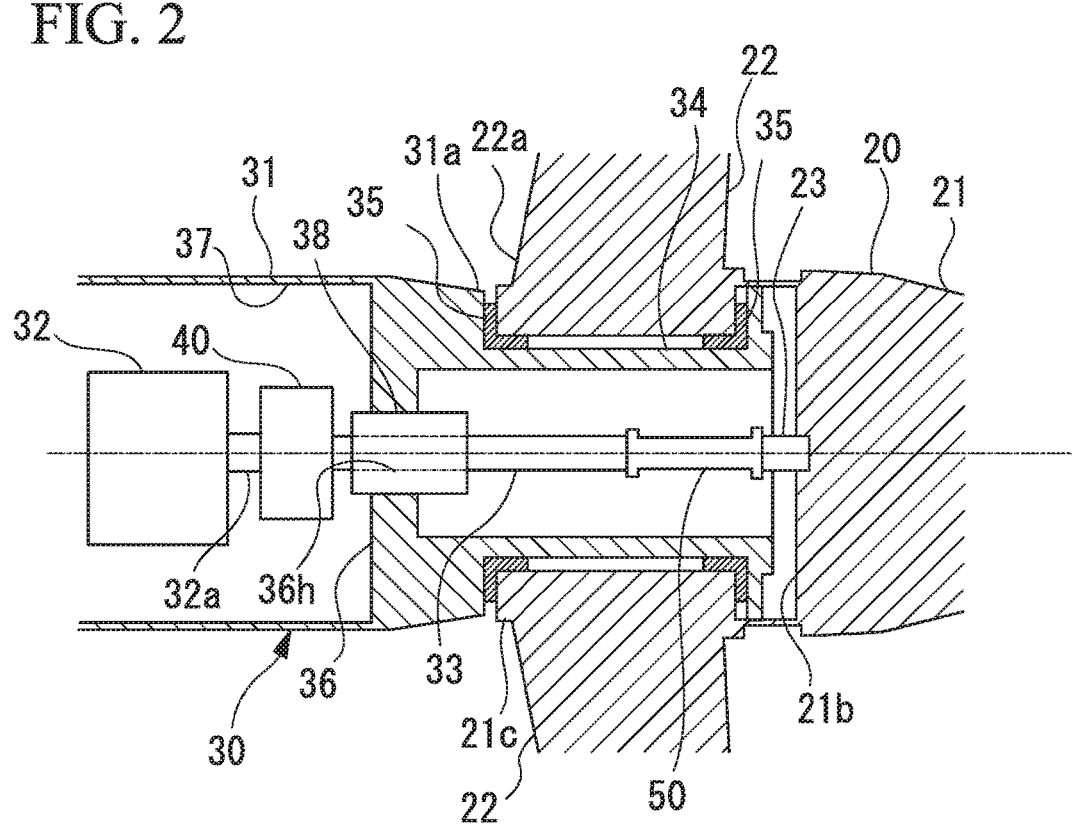
FIG. 2 is a sectional view showing a configuration of a connection portion between a vane wheel and a nacelle according to the embodiment of the water flow power generator.
Figure 3:
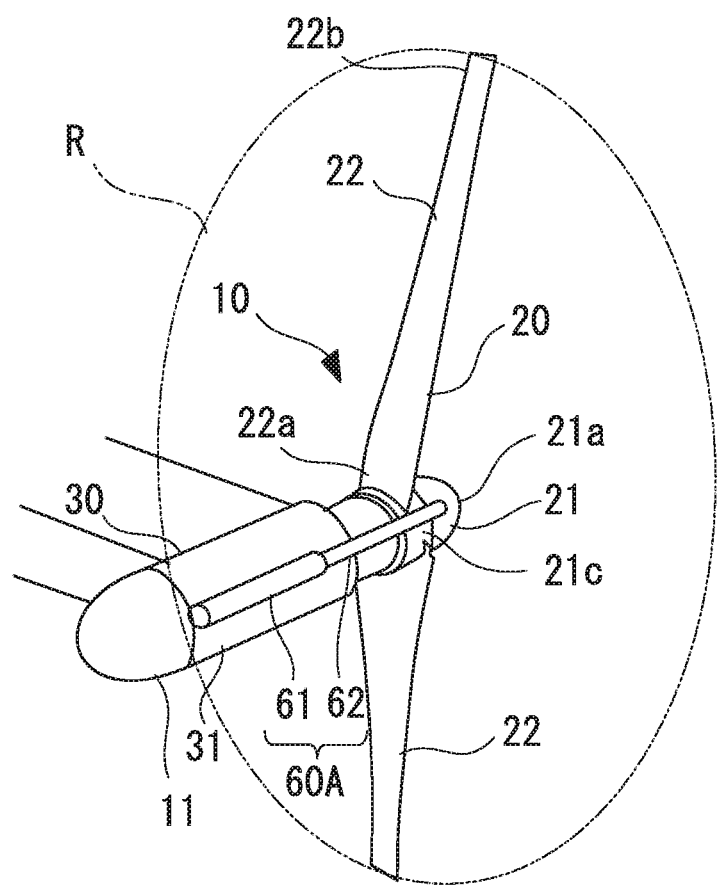
FIG. 3 is a perspective view showing a state where a rod is protruded in a vane wheel stopping mechanism according to a first embodiment of the water flow power generator.

FIG. 1 is a perspective view showing a water flow power generator according to this embodiment. FIG. 2 is a sectional view showing a configuration of a connection portion between a vane wheel and a nacelle according to the embodiment of the water flow power generator. FIG. 3 is a perspective view showing a state where a rod is protruded in a vane wheel stopping mechanism according to a first embodiment of the water flow power generator.

As shown in FIG. 1, a water flow power generator 10 according to this embodiment includes a power generation unit 11 and a structure 12.

The water flow power generator 10 is provided with a pair of right and left power generation units.

The structure 12 connects the pair of right and left power generation units 11 to each other.

The water flow power generator 10 is moored to a subsea structure or an underwater structure by a mooring cable 13 whose end portion is locked to the structure 12.

Each of the power generation units 11 includes a vane wheel 20 and a nacelle 30.

The vane wheel 20 includes a hub 21 and a blade 22.

As shown in FIGS. 1 and 2, the hub 21 is disposed in a center portion of the vane wheel 20. The hub 21 is formed in a so-called cannonball shape whose outer diameter gradually decreases toward a distal end 21a (refer to FIG. 1). The hub 21 has an end surface 21b on a side opposite the distal end 21a. The end surface 21b is orthogonal to a rotation center axis C (hereinafter, simply referred to as an axis C) of the vane wheel 20. In the hub 21, a cylindrical portion 21c is integrally disposed in an outer peripheral portion of the end surface 21b. The cylindrical portion 21c is formed in a cylindrical shape extending toward a side opposite to the distal end 21a in an extending direction of the axis C (hereinafter, simply referred to as a "direction of the axis C"). A shaft 23 is integrally disposed on the end surface 21b of the hub 21. The shaft 23 protrudes toward the side opposite to the distal end 21a in the direction of the axis C.

A plurality of blades 22 are disposed at intervals in a circumferential direction in an outer peripheral portion of the hub 21.

In this embodiment, two blades 22 are disposed therein. These two blades 22 are respectively arranged at rotationally symmetrical positions. In each of the blades 22, a proximal end portion 22a thereof is integrally fixed to the cylindrical portion 21c of the hub 21. Each of the blades 22 extends radially outward from the hub 21 toward the distal end portion 22b.

The nacelle 30 includes a casing 31, a power generator 32, and a main shaft 33.

The casing 31 is formed in a cylindrical shape extending in the direction of the axis C. A vane wheel support 34 is disposed in a first end portion 31a of the casing 31. The vane wheel support 34 rotatably supports the vane wheel 20. A pair of external bearings 35 is disposed at an interval in the direction of the axis C, on an outer peripheral surface of the vane wheel support 34. The vane wheel 20 is rotatably supported by the vane wheel support 34 via the external bearings 35. For example, each of the external bearings 35 is formed of a resin, and functions as a so-called sliding bearing which rotatably supports the vane wheel 20 by using the surrounding seawater as a lubricant.

A partition wall 36 is disposed inside the casing 31. The partition wall 36 has a plane which is orthogonal to the axis C and which faces a side opposite to the first end portion 31a (hereinafter, simply referred to as a second end side) in the direction of the axis C. Inside the casing 31, a sealed power generator room 37 is formed on the second end side from the partition wall 36 in the direction of the axis C. The inside of the power generator room 37 functions as an air atmosphere. The power generator 32 is accommodated in the power generator room 37.

The power generator 32 includes an input shaft 32a. The input shaft 32a protrudes toward a side close to the partition wall 36 along the axis C. The power generator 32 includes a rotor (not shown) disposed integrally with the input shaft 32a, and a stator (not shown) which faces the rotor. The power generator 32 generates electric power in such a way that the rotor is rotated relative to the stator together with the input shaft 32a. The electric power generated by the power generator 32 is supplied to the outside via a transmission line (not shown). The main shaft 33 is connected to the input shaft 32a of the power generator 32 via a speed increaser (not shown) and a brake 40.

The brake 40 can reduce and stop the rotation speed of the vane wheel 20. Under control of a controller (not shown) included in the water flow power generator 10, the brake 40 applies a braking force to the main shaft 33, for example, in a case where an abnormality occurs such as a case of exceeding a predetermined rotation speed, or when regular maintenance work is carried out.

The main shaft 33 extends into the vane wheel support 34 through a shaft hole 36h formed on the partition wall 36. A ring-shaped sealing member 38 is disposed between the main shaft 33 and the shaft hole 36h.

The sealing member 38 prevents water from permeating into the power generator room 37 from the periphery of the main shaft 33.

A coupling joint 50 is disposed between the main shaft 33 and the shaft 23 disposed in the hub 21 of the vane wheel 20. Through the coupling joint 50, the main shaft 33 and the shaft 23 are connected to each other in a state where relative displacement is available in an axial direction, a radial direction, and an inclined direction.

As shown in FIG. 1, each of the power generation units 11 includes a vane wheel rotation stopping mechanism 60A.

The vane wheel rotation stopping mechanism 60A is disposed in the nacelle (substrate) 30 or the structure (substrate) 12 (nacelle 30 in the example of FIG. 1). The vane wheel rotation stopping mechanism 60A includes a case 61 and a rod (rotation stopping member) 62.

The case 61 has a cylindrical shape, and is fixed to the outer peripheral surface of the nacelle 30.

The rod 62 is disposed inside the case 61. The rod 62 is slidable and displaceable toward the vane wheel 20 side by a drive mechanism (not shown) using spring force, hydraulic pressure, or pneumatic pressure.

As shown in FIG. 3, in a state where the rod 62 protrudes from the case 61, the rod 62 is disposed inside a rotational trajectory R of the blade 22 of the vane wheel 20, that is, at a position intersecting a rotation plane of the rotational trajectory R. In other words, the rod 62 enters the inside of the rotational trajectory R, thereby causing the rod 62 to interfere with the blade 22. The interference of the rod 62 hinders a pivoting movement of the vane wheel 20.

An operation of the vane wheel rotation stopping mechanism 60A is controlled by a controller (not shown) included in the water flow power generator 10. For example, a sensor (not shown) for measuring the rotation speed of the main shaft 33 and the rotation speed of the shaft 23 may be disposed inside the nacelle 30. In a case where a difference in the rotation speeds between the main shaft 33 and the shaft 23 which are detected by the sensor exceeds a predetermined reference value, the controller determines that a failure has occurred in the coupling joint 50, and the operates the vane wheel rotation stopping mechanism 60A. In this manner, the rod 62 protrudes. The protruded rod 62 causes the rod 62 to interfere with the blade 22, thereby stopping the pivoting movement of the vane wheel 20. Here, a case has been described where the vane wheel rotation stopping mechanism 60A is operated based on the predetermined reference value of the rotation speed. However, whether to stop the vane wheel rotation stopping mechanism 60A under any conditions may be appropriately set.

Therefore, according to the water flow power generator in the above-described first embodiment, the rod 62 of the vane wheel rotation stopping mechanism 60A can enter the inside of the rotational trajectory R of the vane wheel 20. Accordingly, the rod 62 can interfere with the blade 22 of the vane wheel 20 so as to stop the rotation of the vane wheel 20. In this manner, even in an emergency, the vane wheel 20 can be reliably stopped.

Second Embodiment

Next, a second embodiment of the water flow power generator according to this invention will be described. In the second embodiment to be described below, only a configuration of a vane wheel rotation stopping mechanism 60B is different from that according to the first embodiment. Thus, a description will be provided using the same reference numerals for elements the same as those according to the first embodiment, and a repeated description will be omitted.

Figure 4:
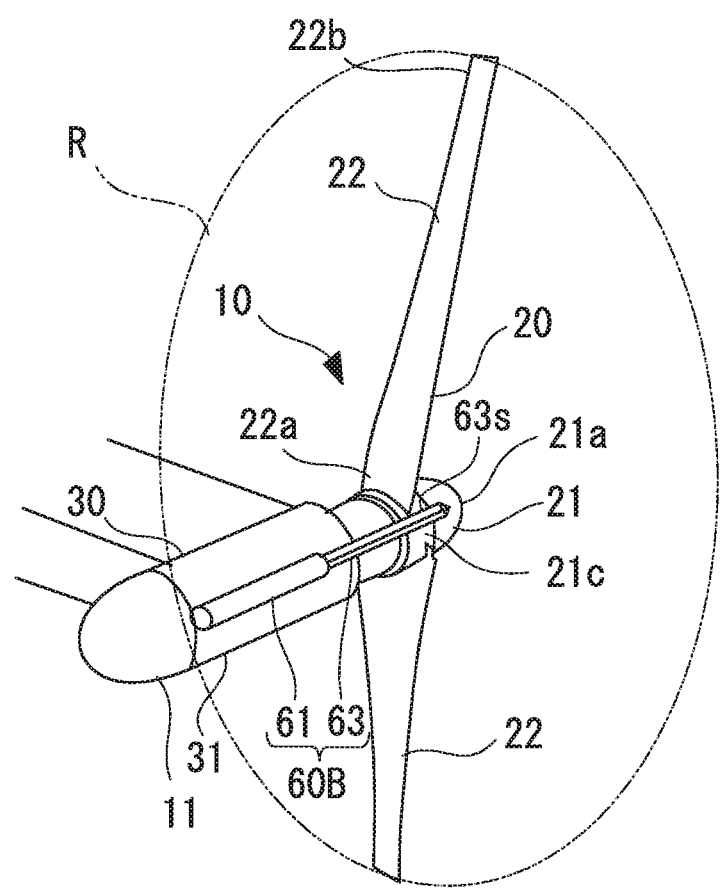
FIG. 4 is a perspective view showing a state where a rod is protruded in a vane wheel stopping mechanism according to a second embodiment of the water flow power generator.

FIG. 4 is a perspective view showing a state where the rod is protruded in the vane wheel stopping mechanism according to the second embodiment of the above-described water flow power generator.

As shown in FIG. 4, each power generation unit 11 of the water flow power generator 10 according to this embodiment includes the vane wheel rotation stopping mechanism 60B. The vane wheel rotation stopping mechanism 60B is disposed in the nacelle 30 or the structure 12 (nacelle 30 in the example of FIG. 4). The vane wheel rotation stopping mechanism 60B includes the case 61 and the rod (rotation stopping member) 63.

The case 61 is formed in a cylindrical shape. The case 61 is fixed to the outer peripheral surface of the nacelle 30.

The rod 63 is disposed inside the case 61. The rod 63 is slidable and displaceable toward the vane wheel 20 side by a drive mechanism (not shown) using a spring force, hydraulic pressure, or pneumatic pressure. In a state where the rod 63 protrudes from the case 61, the rod 63 is disposed inside the rotation plane of the rotational trajectory R of the blade 22 of the vane wheel 20, that is, at the position intersecting with the rotational trajectory R. In this manner, the rod 63 interferes with the blade 22, thereby hindering the pivoting movement of the vane wheel 20.

In the rod 63, a sharp corner 63s is formed at a position facing a side surface of the pivoting blade 22. The sharp corner 63s is formed into a wedge shape or a blade shape whose cross section is formed at an acute angle. In the rod 63 of the sharp corner 63s, at least the sharp corner 63s is formed of a material which is harder than that of the blade 22. For example, in a case where the blade 22 is made of reinforced fiber plastic, the sharp corner 63s can be made of metal.

An operation of the vane wheel rotation stopping mechanism 60B is controlled by a controller (not shown) disposed in the water flow power generator 10. When a predetermined condition is satisfied, the controller causes the rod 63 to slide and be displaced toward the vane wheel 20 side. If the rod 63 protrudes, the rod 63 interferes with the blade 22 of the pivoting vane wheel 20. Since the sharp corner 63s is formed in the rod 63, the sharp corner 63s interlocks with a side portion of the blade 22 or cuts the blade 22. In a case where the sharp corner 63s interlocks with the blade 22, the sharp corner 63s is locked to the blade 22, thereby stopping the vane wheel 20. In a case where the blade 22 is cut, the blade 22 cannot rotate while receiving the ocean current. Accordingly, the vane wheel 20 is stopped.

Therefore, according to the water flow power generator in the above-described second embodiment, the rod 63 of the vane wheel rotation stopping mechanism 60B can enter the inside of the rotational trajectory R of the vane wheel 20. Accordingly, the rod 63 can interfere with the blade 22 of the vane wheel 20 so as to stop the rotation of the vane wheel 20.

Furthermore, since the rod 63 enters the inside of the rotational trajectory R of the vane wheel 20, the sharp corner 63s of the rod 63 can interlock with the side portion of the blade 22, or the sharp corner 63s can cut the blade 22. As a result, the rotation of the vane wheel 20 can be more reliably stopped.

Modification Example of First and Second Embodiments

Here, in the first and second embodiments described above, the vane wheel rotation stopping mechanisms 60A and 60B are installed on the outer peripheral surface of the nacelle 30. However, the embodiments are not limited to this configuration. The vane wheel rotation stopping mechanisms 60A and 60B may be disposed on the outer peripheral surface of the structure 12. The vane wheel rotation stopping mechanisms 60A and 60B may be accommodated inside the structure 12 so that the rods 62 and 63 protrude outward from the structure 12.

Third Embodiment

Next, a third embodiment of the water flow power generator according to this invention will be described. In the third embodiment, only a configuration of a vane wheel rotation stopping mechanism 60C is different from that according to the first and second embodiments. Thus, a description will be provided using the same reference numerals as elements the same as those according to the first and second embodiments, and a repeated description will be omitted.

Figure 5:
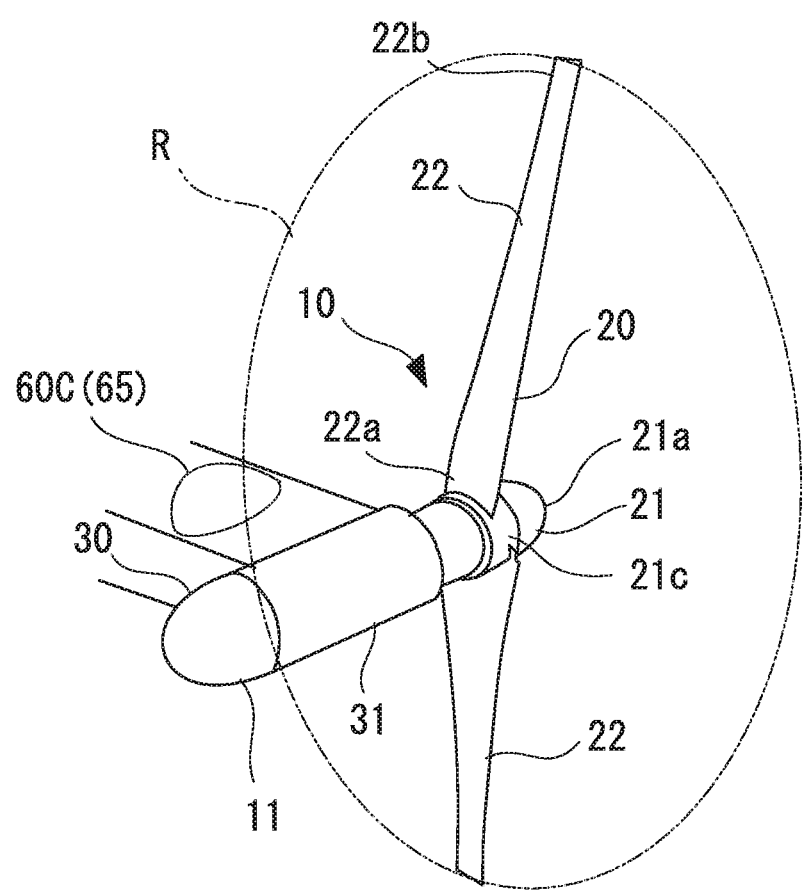
FIG. 5 is a perspective view showing a vane wheel stopping mechanism according to a third embodiment of the water flow power generator.
Figure 6:
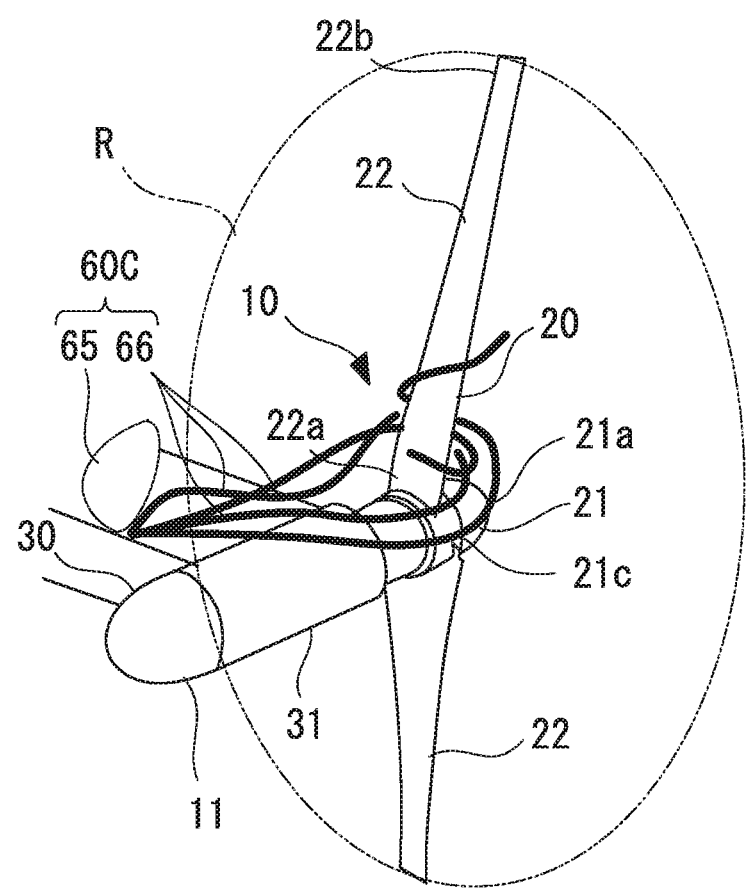
FIG. 6 is a perspective view showing a state where a restiform body is deployed in the vane wheel stopping mechanism according to the third embodiment of the water flow power generator.

FIG. 5 is a perspective view showing the vane wheel stopping mechanism according to the third embodiment of the water flow power generator. FIG. 6 is a perspective view showing a state where a restiform body is deployed.

As shown in FIGS. 5 and 6, each of the power generation units 11 of the water flow power generator 10 according to this embodiment includes the vane wheel rotation stopping mechanism 60C.

The vane wheel rotation stopping mechanism 60C is disposed in the nacelle 30 or the structure 12 (structure 12 in the example of FIG. 5). The vane wheel rotation stopping mechanism 60B includes the case 65 and a restiform body (rotation stopping member) 66.

The case 65 has a hollow lid shape, and is disposed on the outer peripheral surface of the nacelle 30 so as to be openable. The case 65 is controlled by a controller (not shown) disposed in the water flow power generator 10, and is opened in a case where a predetermined condition is satisfied. The case 65 is disposed on an upstream side of the ocean current with respect to the vane wheel 20.

A plurality of restiform bodies 66 are disposed inside the case 65. For example, the restiform body 66 is made of a metal wire, a cable having predetermined breaking strength, or a rope. The restiform body 66 is normally accommodated inside the case 65. As shown in FIG. 6, if the case 65 is opened, the restiform body 66 is deployed by the ocean current so as to extend toward the vane wheel 20 side. In a state where the restiform body 66 extends from the case 65, the restiform body 66 enters the inside of the rotation plane of the rotational trajectory R of the blade 22 of the vane wheel 20, and interfere with the blade 22. Then, along with the pivoting movement of the vane wheel 20, the restiform body 66 gradually becomes entangled with the vane wheel 20, thereby hindering the pivoting movement of the vane wheel 20.

Therefore, according to the water flow power generator of the third embodiment described above, the rotation of the vane wheel 20 can be stopped by the restiform body 66 entangled with the vane wheel 20.

Modification Example of Third Embodiment

In the third embodiment, the distal end portion of the restiform body 66 may be provided with a parachute which receives pressure from the ocean current. According to this configuration, the pressure of the ocean current is received by the parachute. Accordingly, the restiform body 66 is smoothly deployed toward the vane wheel 20.

Instead of the restiform body 66, other members such as a net may be used.

Other Modification Example

This invention is not limited to the above-described embodiments, and includes those in which various modifications are added to the above-described embodiments within the scope not departing from the gist of this invention. That is, the specific shapes or configurations described in the embodiments are merely examples, and can be appropriately changed.

In each of the above-described embodiments and modifications, a case has been described where the water flow power generator 10 is installed in the deep sea, but this invention is not limited to the deep sea.

Furthermore, in each of the above-described embodiments and modifications, a case has been described where the two power generation units 11 are provided, but the number of power generation units 11 is not limited to two.

Furthermore, as long as the plurality of blades 22 of the vane wheel 20 are provided, the number of blades is not limited to the above number.

Additionally, other configurations can be appropriately adopted for the configuration of each portion of the water flow power generator 10.

INDUSTRIAL APPLICABILITY

This invention is applicable to a water flow power generator. The water flow power generator to which this invention is applied can reliably stop the rotation of a vane wheel at low cost.

REFERENCE SIGNS LIST

10 Water Flow Power Generator
11 Power Generation Unit
12 Structure (Substrate)
13 Mooring Cable
20 Vane Wheel
21 Hub
21a Distal End
21b End Surface
21c Cylindrical Portion
22 Blade
22a Proximal End Portion
22b Distal End Portion
23 Shaft
30 Nacelle (Substrate)
31 Casing
31a First End Portion
32 Power Generator
32a Input Shaft
33 Main Shaft
34 Vane Wheel Support
35 External Bearing
36 Partition Wall
36h Shaft Hole
37 Power Generator Room
38 Sealing Member
40 Brake
50 Coupling Joint
60A, 60B, 60C Vane Wheel Rotation Stopping Mechanism
61 Case
62, 63 OD (Rotation Stopping Member)
63s Sharp Corner
65 Case
66 Restiform Body (Rotation Stopping Member)

What is claimed is:

1. A water flow power generator comprising:
   a nacelle;
   a vane wheel that is disposed so as to be rotatable relative to the nacelle, and that rotates while causing a plurality of vanes to capture a water flow;
   a power generator that is disposed inside the nacelle, and that outputs electric energy by converting rotational energy transmitted from the vane wheel into the electric energy; and
   a vane wheel rotation stopping mechanism having a rotation stopping member that is disposed on can outside periphery surface of the nacelle, the rotation stopping member including a rod that enters inside of a rotational trajectory of the vane wheel from outside of the rotational trajectory of the vane wheel,
   wherein the rod of the rotation stopping member which is slidable and extends in a longitudinal direction thereof to inside the rotational trajectory of the vane wheel.

2. The water flow power generator according to claim 1, wherein the rod has a sharp corner having a sharp section oriented in a direction opposite to a rotation direction of the vane wheel, at a location intersecting at least the rotational trajectory.

3. A water flow power generator comprising:
   a nacelle;
   a vane wheel that is disposed so as to be rotatable relative to the nacelle, and that rotates while causing a plurality of vanes to capture a water flow;

a power generator that is disposed inside the nacelle, and that outputs electric energy by converting rotational energy transmitted from the vane wheel into the electric energy; and a vane wheel rotation stopping mechanism having a rotation stopping member that is disposed on an outside periphery surface of the nacelle, the rotation stopping member including a restiform body that enters inside of a rotational trajectory of the vane wheel from outside of the rotational trajectory of the vane wheel, wherein the restiform body is deployed toward the inside of the rotational trajectory of the vane wheel.

* * * * *